US008102559B2

(12) United States Patent
Davis et al.

(10) Patent No.: US 8,102,559 B2
(45) Date of Patent: Jan. 24, 2012

(54) SYSTEM AND METHOD FOR CONTROLLING PRINTING APPLICATIONS OVER VARIABLE LAYOUTS

(75) Inventors: John D. Davis, Grafton, WI (US); Rickey M. Fullmer, Grafton, WI (US); Michael S. Lafranzo, Elburn, IL (US); Richard L. Lenski, Downers Grove, IL (US); Charles J. Novak, Jr., Menomonee Falls, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1024 days.

(21) Appl. No.: 11/549,372

(22) Filed: Oct. 13, 2006

(65) Prior Publication Data

US 2008/0143750 A1 Jun. 19, 2008

(51) Int. Cl.
*G06K 15/00* (2006.01)

(52) U.S. Cl. ......... 358/1.18; 358/1.1; 101/147; 101/484

(58) Field of Classification Search ................. 358/1.18, 358/1.1; 101/147, 484
See application file for complete search history.

(56) References Cited

U.S. PATENT DOCUMENTS

| | | | | |
|---|---|---|---|---|
| 6,499,402 | B1 * | 12/2002 | Sikes et al. | 101/484 |
| 6,589,292 | B1 * | 7/2003 | Langford-Wilson | 715/210 |

FOREIGN PATENT DOCUMENTS

| | | |
|---|---|---|
| GB | 2217653 | 11/1989 |
| WO | 9115369 | 10/1991 |

OTHER PUBLICATIONS eae_archives.pdf EAE, Control Console, Sep. 2002 http://web.archive.org/web/20030728042927/www.eae.com/e/gi/pdf/leitstand_en.pdf.*
eae,wayback machine screen shot.*
EAE, Ahrensburg, Germany, Open Press, Control Console, www.eae.com, Jan. 2005, pp. 1-6.
EP 07118461.8. European Search Report dated Sep. 30, 2011. pp. 1-7.

* cited by examiner

*Primary Examiner* — Benny Tieu
*Assistant Examiner* — Martin Mushambo
(74) *Attorney, Agent, or Firm* — Quarles & Brady LLP; William R. Walbrun; John M. Miller

(57) ABSTRACT

A system and method for accurately controlling a printing process regardless web width or printing layout. A user interface is provided for configuring a printing application that includes a plurality of sensors arranged to form an interface region. The sensors are configured to generate feedback indicating user interaction with the interface region. A controller is configured to map the plurality of sensors into virtual keys based on at least a columniation of the printing application and adjust parameters of the printing application based on the feedback.

18 Claims, 2 Drawing Sheets

SYSTEM AND METHOD FOR CONTROLLING PRINTING APPLICATIONS OVER VARIABLE LAYOUTS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates generally to printing systems and, more particularly, to a system and method for controlling printing applications over a variety of columned layouts and across a variety of web sizes.

In the newspaper printing industry, the cost of paper constitutes one of the primary expenses in publishing a copy of the newspaper. As such, newspaper printers have sought to reduce the amount of paper required to print each copy. For example, newspaper printers have often reduced or removed margins surrounding the print and shrunk fonts. Additionally, many newspaper printers have sought to reduce the size of each page. For example, many printers have identified that switching from a fifty-four inch wide page to fifty or forty-eight inch wide page would result in a significant cost savings.

However, traditional printing press systems were designed to utilize a particular web width. That is, the printing presses were designed to apply ink along a particular web width. Furthermore, operator consoles that control and allow augmentation of the printing process were designed to control the application of ink across a particular number of columns on the particular web width. For example, the operator consoles include keyboards that have predefined key layouts matched or mapped to the size of the web and the number of columns to be formed on the web to print a given page. Accordingly, a printing press operator could place a reference copy of the paper on the console and use the keys aligned with a particular column to adjust the print parameters, for example, the ink levels, applied to that column to match the printing to the reference copy.

To allow a printer to print using different webs with different widths on a press with a fixed inker width, "multi-web" features have been added. In general, these multi-web features utilize a computerized control system that attempts to map the eight page keys on the screen or the laydown keyboard to the size and spacing associated with a selected web width. The operator then communicates a desired change using the screen or keyboard, and the system determines how to achieve a particular change indicated by the operator to the desired portion of the page.

When attempting to map the keyboard to the size and spacing associated with a selected web width, some systems have been developed that disable keys on the keyboard that correspond to areas extending beyond the selected web width being printed. Although this approach has been effective in allowing a fixed keyboard to be used to control a variable page width, printing press operators lose the ability to directly compare and coordinate printing adjustments for a particular column based on a reference copy. In particular, while such systems allow an operator to print a web having a somewhat reduced width, if the web width is significantly reduced, it is difficult for the operator to determine which keys of the operator keyboard correspond to a particular column or portion of the reference copy. As such, in some cases, it is necessary to change the keyboard to another keyboard having a configuration matched to the size and column arrangement of the reference copy.

Therefore, it would be desirable to have a system and method for facilitating control of a printing process over a variety of web widths without requiring an operator to extrapolate the relationship between a keyboard and a reference copy or to physically replace the keyboard to match the size and layout of the reference copy.

BRIEF SUMMARY OF THE INVENTION

The present invention overcomes the aforementioned drawbacks by providing a system and method for allowing a user to control any of a wide variety of web sizes and column positions without the need to extrapolate the relationship between key positions and columns of a reference copy and without requiring a keyboard replacement for each web width or layout. In particular, a keyboard system is provided that is capable of dynamically mapping keys and operator selector switches to match the layout of a reference copy. The keyboard allows an operator to adjust both ink and water applied to a printed web without the use of a multi-web mapping program and offers direct correlation of keys to columns or portions of a reference copy, independent of web width. Accordingly, adjustment errors and the time required to make an adjustment are reduced. As such, material waste is reduced.

In accordance with one aspect of the present invention, a user interface for configuring a printing application is disclosed that includes a plurality of sensors arranged to form an interface region. The sensors are configured to generate feedback indicating user interaction with the interface region. The user interface also includes a controller configured to map the plurality of sensors into virtual keys based on at least a columniation of the printing application and adjust parameters of the printing application based on the feedback.

In accordance with another aspect of the present invention, an operator counsel keyboard for controlling a printing press during a newspaper printing application is disclosed. The operator counsel keyboard includes a plurality of sensors arranged to form a substantially continuous interface region and configured to generate feedback indicating user interaction with the substantially continuous interface. A controller is included that is configured to segregate the plurality of sensors into virtual keys, where each virtual key corresponding to a respective portion of a newspaper layout used for the newspaper printing application. As such, feedback from a sensor segregated into a given virtual key corresponding to a given portion causes the controller to adjust parameters of the newspaper printing application affecting the given portion.

In accordance with yet another aspect of the invention, a keyboard for controlling a newspaper printing application based on a columned layout of a newspaper is disclosed. The keyboard includes a plurality of sensors arranged to form a substantially continuous interface region and configured to generate feedback indicating user interaction with a portion of the substantially continuous interface. A controller is configured to map the plurality of sensors into virtual keys, where each virtual key corresponding to a respective column of the columned layout of the newspaper. Accordingly, feedback from a sensor mapped into a given virtual key corresponding to a given column causes the controller to adjust parameters of the newspaper printing application affecting the given column.

Various other features of the present invention will be made apparent from the following detailed description and the drawings.

BRIEF DESCRIPTION OF THE SEVERAL VIEWS OF THE DRAWINGS

The invention will hereafter be described with reference to the accompanying drawings, wherein like reference numerals denote like elements, and.

DETAILED DESCRIPTION OF THE INVENTION

Figure 1:
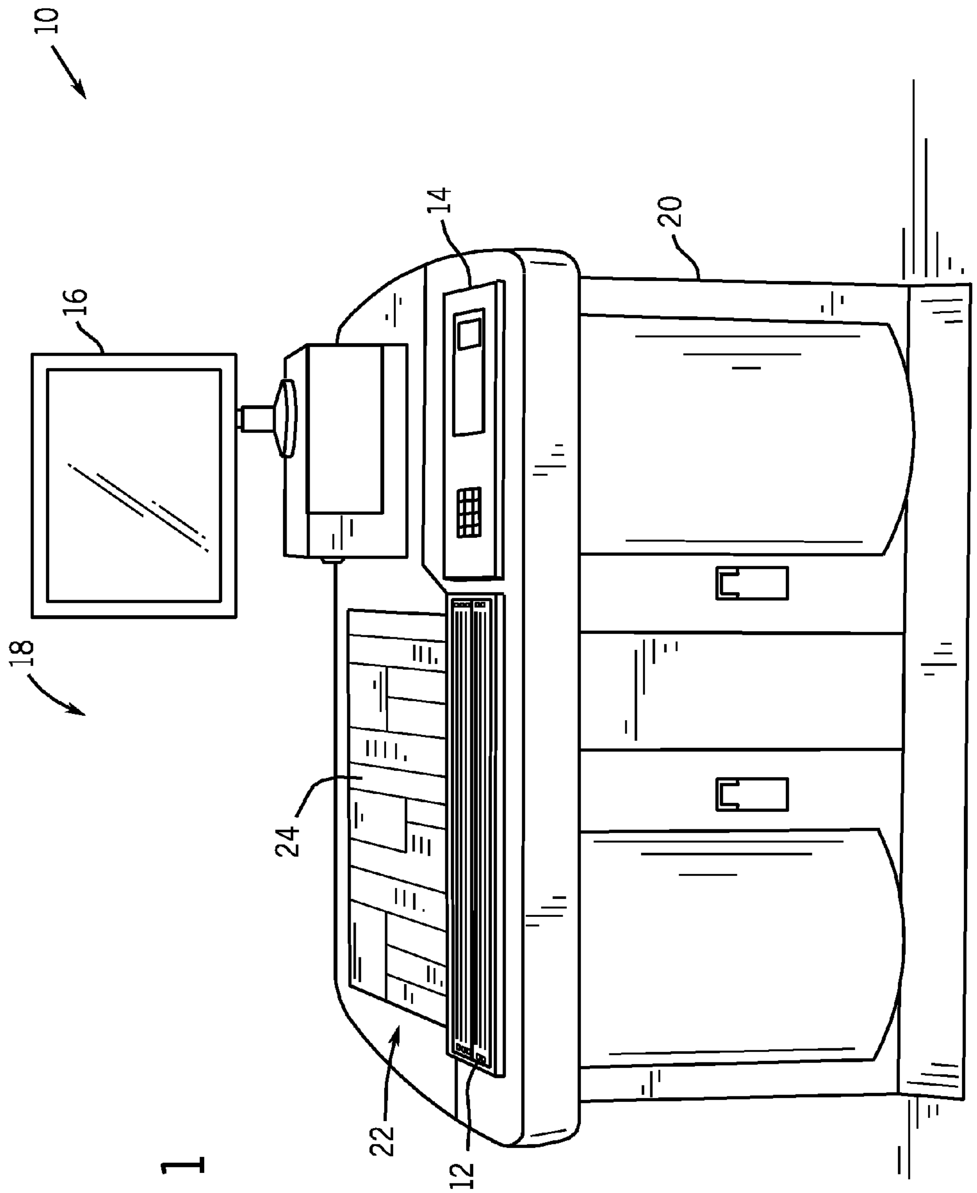
FIG. 1 is a perspective view of an operator counsel for controlling a newspaper printing application.

Referring to FIG. 1, an operator console 10 includes a primary keyboard 12, a secondary keyboard 14, and a monitor 16 arranged along a worksurface 18. The worksurface 18 is supported by cabinets 20 that house a computer system (not shown) that, as will be described, operates as a controller for controlling the operator counsel 10, and a newspaper printing process controlled by the operator counsel 10. The worksurface 18 also provides a space 22 designed to have a reference copy of a newspaper page 24 arranged thereon. In particular, the space 22 allows an operator to position the reference copy of the newspaper page 24 next to the keyboard 14. As will be described with respect to FIG. 2, the keyboard 12 has a dynamically adjustable layout that can be matched to the size and layout of the reference copy of the newspaper 24, regardless of dimensions or layout. Accordingly, an operator is provided with a direct correlation between keys on the keyboard 12 and the content on the reference copy of the newspaper 24. As such, adjustments to the ink or dampening applied to a portion of the printing system corresponding to a given portion of the reference copy of the newspaper 24 can be readily made by simply pressing virtual keys aligned with the given portion of the reference copy of the newspaper 24.

Figure 2:
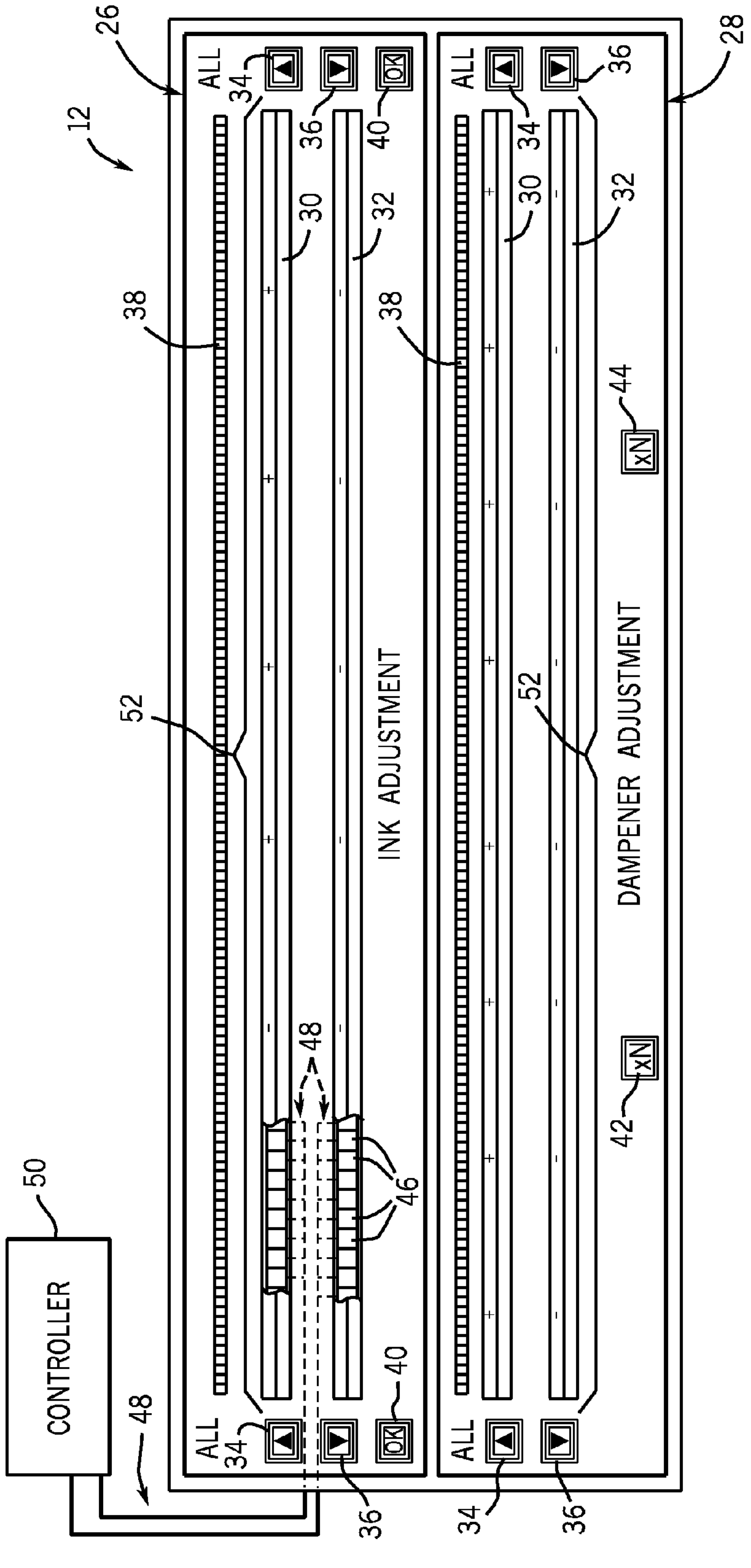
FIG. 2 is a plan view of a keyboard of the operator counsel of FIG. 1 and associated controller.

Referring now to FIG. 2, the keyboard 12 includes an ink adjustment portion 26 and a dampener adjustment portion 28. Physically, the ink adjustment portion 26 and the dampener adjustment portion 28 are similar. In particular, the ink adjustment portion 26 and the dampener adjustment portion 28 include a positive increment substantially continuous interface region 30 and a negative increment substantially continuous interface region 32. At the end of the substantially continuous interface regions 30, 32, a left and right page "ALL" increment interfaces 34 and "ALL" decrement interfaces 36 are included. Additionally, the ink adjustment portion 26 and the dampener adjustment portion 28 include a row of status indicators 38 arranged above the substantially continuous interface regions 30, 32. As shown, the ink adjustment portion 26 includes a pair of "OK" interfaces 40 located proximate to the ALL interfaces 34, 36. The dampener adjustment portion 28 includes a left page increment/decrement size selection interface 42 and a right page increment/decrement size election interface 44.

The substantially continuous interface regions 30, 32 are formed by a plurality of sensors 46. In particular, it is contemplated that the sensors 46 may be piezoelectric sensors covered by a mask indicating the location of the sensor strip and whether the sensors 46 are designated to cause positive or negative increments. Alternatively, it is contemplated that the sensors 46 may be resistive sensors, for example, formed from a rubber bar strip with carbon contact designed to interact with an edged circuit board. In any case, the sensors 46 are connected through a plurality of feedback connections 48 to a controller 50.

In operation, the operator uses the operator console 10 of FIG. 1 to enter job-related setup codes. The controller 50 uses these setup codes to determine the column spacing of the printing job indicated by the setup codes and, therefrom, a corresponding keyboard layout. In particular, the setup codes include information about the width of the web that will be printed, the preferred number of keys needed to adjust printing parameters, and the preferable width of the keys. As will be described, the controller 50 uses this information to segregate the substantially continuous interface regions 30, 32 into virtual keys that are mapped to the columns of the selected printing job so that the virtual keys are aligned with the columns of a reference copy 24 (FIG. 1) when positioned proximate to the keyboard 12.

For example, the setup codes may be traditional ASCII codes, such as are commonly used by a PressView computer system. The controller 50 uses this information to control ink and dampener adjustments required on a page, plate, or couple basis. In addition to these traditional inputs, the controller 50 is also designed to receive the column spacing of the laydown, which may also be received as an ASCII input from a PressView computer. Therefore, the values for web width, number of keys, and key width are all sent as setup values using an initialization message for the keyboard 12. The controller 50 can then set parameters for ink and dampener adjustments. The web width value and number of dampener nozzles are used by the controller 50 to setup the dampener adjustment columns.

In particular, a particular printing job might use a single width web of 36 inches printed with twelve columns on each page. Should the keyboard 12 be designed to accommodate a maximum web width of 54 inches using a printing press having an eight nozzle spray bar, the controller would disable the sensors 46 extending along the outer nine inches of the substantially continuous interface regions 30, 32 of the ink adjustment portion 26. To disable particular sensors 46, the controller 50 may not de-activate sensors 46 but may simply disregard feedback from the sensors 46 designated as disabled during a particular printing job. The active sensor 46 located about the center point marker 52 of the substantially continuous interface regions 30, 32 of the ink adjustment portion 26 are then segregated into virtual keys mapped to align with the columns of a reference copy of the printing job when the center fold dividing two pages of the reference copy is aligned with the center point marker 52. In the case of a 36 inch wide web having twelve columns on each page, the substantially continuous interface regions 30, 32 would be segregated by the controller 50 so that each key spans approximately 1.5 inches, including border spacings that divide the virtual keys. Similarly, the substantially continuous interface regions 30, 32 of the dampener adjustment portion 26 are segregated into virtual keys mapped based on the width of the particular web being printed and the number of dampener nozzles included in the printing system.

To communicate the location of the virtual keys to the operator, the controller 50 controls the status indicators 38. In particular, it is contemplated that the status indicators 38 may include a plurality of light emitting diodes (LEDs). In this case, the controller 50 controls illumination of the LEDs to show the location of each virtual key. For example, the LEDs located between or along the boundaries of the virtual keys are illuminated and the LEDs located directly above a virtual key are left un-illuminated. Accordingly, an operator can readily see the alignment of the virtual keys with respect to the column positions across a reference page 24 (FIG. 1) when positioned proximate to the keyboard 12.

In addition, it is contemplated that the controller 50 may control particular LEDs to illuminate or flash in response to operator interaction with a particular virtual key. This may be used in addition to or instead of tactile feedback systems. That is, it is contemplated that the virtual keys may lack tactile feedback, such as experienced when pushing a button. As such, the controller 50 can control the status indicators 38 corresponding to a particular virtual key to illuminate, blink, or flash as when the virtual key is pressed by the operator.

It is also contemplated that the LEDs may be monochrome LEDs and; therefore, have only an "ON" and "OFF" state. Alternatively, the LEDs may be bi-polar LEDs. In this case, the LEDs would have an "OFF" state and two "ON" states that are differentiated by the color of light emitted by the LED. One color may be used to indicate virtual key location, as described above, and the other color may be used to communicate feedback, instead of or in conjunction with flashing or blinking. For example, the LEDs in the ink adjustment portion 26 may be red/green LEDs and the LEDs of the dampener adjustment portion 28 may be white/blue LEDs.

The above-described keyboard design may have the same dimensions as the traditional keyboards so that they can be readily retrofitted into traditional operator counsels. Alternatively, the keyboard may have a reduced length, for example, an overall length of 40 inches. In this case, the width of the keyboard may be the same or less than traditional keyboards.

Therefore, a system and method is provided for a reconfigurable operator laydown keyboard. The keyboard can be automatically reconfigured based on each printing job to represent the job selected for production without restrictions to pre-defined page and column widths. Both the ink and water mapping adjustment keys and indicators for column spacing are automatically adjusted to represent the job currently in production. Ink and water keys not required for production can be automatically de-activated. Accordingly, an operator can accurately make color corrections to printed material during the adjustment period, thereby, saving time and reducing waste.

The present invention has been described in terms of the various embodiments, and it should be appreciated that many equivalents, alternatives, variations, and modifications, aside from those expressly stated, are possible and within the scope of the invention. Therefore, the invention should not be limited to a particular described embodiment.

We claim:

1. A user interface for configuring a printing press in a production environment comprising:

a first row of ink adjustment sensors and a second row of dampener adjustment sensors, the ink adjustment sensors and the dampener adjustment sensors arranged to form an interface region and configured to generate feedback indicating user interaction with the interface region; and a controller configured to dynamically map the ink adjustment sensors and the dampener adjustment sensors into rows of virtual keys based on at least a columniation of a print layout and independent of a web width, and the controller configured to adjust ink parameters of the printing press in the production environment based on feedback from the first row of the ink adjustment sensors and adjust dampener parameters of the printing press in the production environment based on feedback from the second row of the dampener adjustment sensors.

2. The user interface of claim 1 wherein the controller is further configured to dynamically map the ink adjustment sensors and the dampener adjustment sensors into virtual keys so that each column on a given page of the print layout has a corresponding virtual key.

3. The user interface of claim 1 wherein the controller is further configured to dynamically map the ink adjustment sensors and the dampener adjustment sensors based on page size limits of the print layout and disregard feedback from sensors arranged outside the page size limits.

4. The user interface of claim 1 wherein the controller is further configured to adjust the ink and dampener parameters of the print layout based on the feedback associated with a given column of the print layout in response to receiving the feedback from at least one ink adjustment sensor and dampener adjustment sensor mapped into a-virtual keys corresponding to the given column.

5. The user interface of claim 1 further comprising a plurality of status indicators arranged along the interface region and wherein the controller is configured to control a status of the status indicators to indicate a location of the virtual keys on the interface region.

6. The user interface of claim 5 wherein the plurality of status indicators include square light emitting diodes (LEDs) placed back to back along the interface region so as to be solid along the interface region, and wherein the controller is configured to illuminate LEDs to indicate boundaries of the virtual keys.

7. The user interface of claim 5 wherein the plurality of status indicators include LEDs, and wherein the controller is configured to cause the LEDs corresponding to a virtual key to illuminate upon receiving feedback from the sensors mapped into the virtual key.

8. The user interface of claim 1 wherein the ink adjustment sensors and the dampener adjustment sensors include piezoelectric sensors.

9. An operator counsel keyboard for controlling a printing press during a newspaper printing application comprising:

a plurality of ink adjustment sensors arranged to form a substantially continuous ink adjustment interface region and configured to generate feedback indicating user interaction with the substantially continuous ink adjustment interface region;

a plurality of dampener adjustment sensors arranged to form a substantially continuous dampener adjustment interface region and configured to generate feedback indicating user interaction with the substantially continuous dampener adjustment interface region;

a controller configured to dynamically segregate the plurality of ink adjustment sensors and dampener adjustment sensors into ink adjustment virtual keys and dampener adjustment virtual keys independent of a web width, each ink adjustment virtual key and dampener adjustment virtual key corresponding to a respective portion of a newspaper layout used for the newspaper printing application; and wherein feedback from at least one of the ink adjustment sensors segregated into a given ink adjustment virtual key corresponding to a given portion of the newspaper layout causes the controller to adjust ink of the printing press affecting the given portion, and wherein feedback from at least one of the dampener adjustment sensors segregated into a given dampener adjustment virtual key corresponding to a given portion of the newspaper layout causes the controller to adjust dampening of the printing press affecting the given portion.

10. The operator counsel keyboard of claim 9 wherein the controller is further configured to dynamically segregate the ink adjustment sensors and the dampener adjustment sensors based on at least one of page size limits of the newspaper printing application, column locations in the newspaper printing application, ink nozzle locations of the printing press, and dampener nozzle locations of the printing press.

11. The operator counsel keyboard of claim 9 further comprising a plurality of LEDs arranged along the substantially continuous ink adjustment interface region and a plurality of LEDs arranged along the substantially continuous dampener adjustment interface region, and wherein the controller is configured to illuminate LEDs to indicate boundaries of the virtual keys and unilluminate LEDs to indicate the virtual keys.

12. The operator counsel keyboard of claim 11 wherein the controller is further configured to cause the LEDs corresponding to the given virtual keys to flash upon receiving feedback from the ink adjustment sensors and the dampener adjustment sensors segregated into the given virtual keys indicating user interaction with a portion of the substantially continuous ink adjustment interface region or dampener adjustment interface region corresponding to the given virtual keys.

13. The operator counsel keyboard of claim 9 wherein the portion of the newspaper layout is a column.

14. The operator counsel keyboard of claim 9 wherein the ink adjustment sensors and the dampener adjustment sensors include piezoelectric sensors.

15. A keyboard for controlling a newspaper printing press based on a columned layout of a newspaper comprising:

a plurality of ink adjustment sensors arranged to form a substantially continuous ink adjustment interface region and configured to generate feedback indicating user interaction with a portion of the substantially continuous ink adjustment interface;

a plurality of dampener adjustment sensors arranged to form a substantially continuous dampener adjustment interface region and configured to generate feedback indicating user interaction with a portion of the substantially continuous dampener adjustment interface;

a controller configured to dynamically map the plurality of ink adjustment sensors and dampener adjustment sensors into ink adjustment virtual keys and dampener adjustment virtual keys independent of a web width, each ink adjustment virtual key and dampener adjustment virtual key corresponding to a respective column of the columned layout of the newspaper; and wherein feedback from at least one of the ink adjustment sensors mapped into a given ink adjustment virtual key corresponding to a given column causes the controller to adjust ink parameters of the newspaper printing press affecting the given column, and wherein feedback from at least one of the dampener adjustment sensors mapped into a given dampener adjustment virtual key corresponding to a given column causes the controller to adjust dampening parameters of the newspaper printing press affecting the given column.

16. The keyboard of claim 15 wherein the controller is further configured to dynamically map the ink adjustment sensors and the dampener adjustment sensors based on page size limits of the newspaper and at least one of disable sensors arranged outside the page site limits and disregard feedback from sensors arranged outside the page size limits.

17. The keyboard of claim 15 further comprising a plurality of LEDs arranged along the substantially continuous ink adjustment interface region and a plurality of LEDs arranged along the substantially continuous dampener adjustment interface region, and wherein the controller is configured to illuminate LEDs to indicate a position of the virtual keys along the substantially continuous ink adjustment interface region and the substantially continuous dampener adjustment interface region.

18. The keyboard of claim 17 wherein the controller is further configured to cause the LEDs corresponding to the given virtual keys to adjust illumination upon receiving feedback from the ink adjustment sensors and the dampener adjustment sensors mapped into the given virtual keys indicating user interaction with a portion of the substantially continuous ink adjustment interface region or dampener adjustment interface region corresponding to the given virtual keys.

* * * * *